Figure 1:
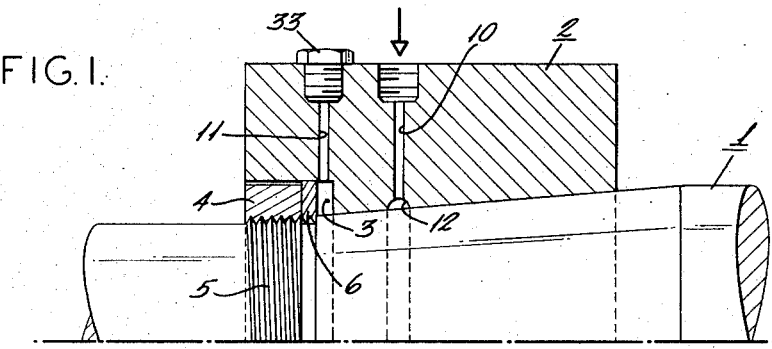

United States Patent [19]
Bratt et al.

[11] 3,865,497
[45] Feb. 11, 1975

[54] PRESS FIT JOINTS FOR MOUNTING BY MEANS OF A PRESSURE MEDIUM

[75] Inventors: Axel Erland Bratt, Molndal; Oscar Evert Ingemar Holst, Goteborg; James Gusten Ragnar Petre, Molndal, all of Sweden

[73] Assignee: SKF Industrial Trading and Development Company N.V., Amsterdam, Netherlands

[22] Filed: Feb. 28, 1972

[21] Appl. No.: 230,008

[30] Foreign Application Priority Data
Mar. 3, 1971 Sweden.............................. 2685/71

[52] U.S. Cl.................................... 403/15, 403/39
[51] Int. Cl............................................. F16d 1/02
[58] Field of Search....... 287/52.06, 52, 53; 29/427, 29/446; 403/15, 16, 37, 39

[56] References Cited
UNITED STATES PATENTS
2,564,670  8/1951  Bratt.............................. 29/427 UX
3,228,102  1/1966  Sillett............................. 29/427 X
3,531,146  9/1970  Blad et al............................. 403/15

Primary Examiner—Andrew V. Kundrat
Attorney, Agent, or Firm—Howson and Howson

[57] ABSTRACT

Press fit joint comprising inner and outer members having co-acting complementary tapered press fit surfaces, an annular piston secured to one of said members and slideable relative to the other of said members, means defining an annular recess in said other member, said piston defining with said recess an annular enclosed chamber for a pressure medium moveable with said other member, means defining a first radial channel in said other member terminating in a circumferential groove communicating with said tapered surfaces and spaced axially from said annular chamber, said channel adapted to be connected to a pressure medium whereby the pressure medium flows between the tapered surfaces and gradually fills the enclosed annular chamber thereby to effect axial displacement of said inner and outer members relative to one another.

5 Claims, 4 Drawing Figures

PATENTED FEB 11 1975          3,865,497

PRESS FIT JOINTS FOR MOUNTING BY MEANS OF A PRESSURE MEDIUM

The present invention relates to press fit joints for mounting by means of a pressure medium, which joint comprises an inner and an outer part provided with co-acting press fit surfaces, in which the axial force required for obtaining the joint is derived from a pressing device at one end of the joint, the pressing device comprising a ring-shaped piston attached to one part of the joint and being axially displaceable in relation to the other part of the joint and together with parts of the respective joint parts limiting a room which is connected to the press fit surfaces and to which a pressure medium can be brought. According to the invention, the pressure medium is pressed between the press fit surfaces of the joint through a channel which ends directly in or in a groove in the surface of one of the joint parts, whereby the pressure medium is brought into the pressing device via that part of the press fit surfaces which is situated between the channel and the pressing device.

In a press fit joint as above, the pressure medium will be pressed between the press fit surfaces if the pressure of the medium is at least equal to the surface pressure of the joint fit. The medium will gradually enter into the pressing device and, if the effective piston area of the pressing device for axial displacement of one joint part is greater than the radial projection of the press fit surface in the joint, one joint part can be pressed upon the other part by means of the medium which is brought into the pressing device.

In a device according to the present invention, the press fit surfaces will be completely separated by a film of the pressure medium before the pressing device is filled with pressure medium for relative displacement of the surfaces if the pressure medium channel ends between the press fit surfaces at a suitable distance from the pressing member.

The invention will now be described with reference to the accompanying drawing in which the FIGS. 1 to 4 show different embodiments of the invention.

In FIG. 1, part of a shaft 1 is shown having a tapered portion on which a sleeve 2 with a tapered bore is mounted. One end of sleeve 2 has a cavity 3 in which an annular piston in shape of a nut 4 can be inserted by screwing it to a threaded part 5 of the shaft 1. The nut 4 seals against the cylindrical wall of the cavity 3 by means of a sealing disc 6. The tapered sleeve is provided with a channel 10 for supplying a pressure medium to the tapered surface of the sleeve. The pressing device is provided with a closed but openable draining channel 11 with a valve bolt 33.

The mounting of the sleeve on the shaft is carried out by pressing a pressure medium through the channel 10 which suitably leads to a groove 12 in the tapered surface of the sleeve and is placed at a distance from the cavity 3. The medium will be spread between the tapered surfaces of the shaft and the sleeve and the cavity 3 will be gradually filled with the pressure medium which presses the sleeve 2 to the right on the shaft. By dismounting the joint a medium is pressed into the same channel 10 as by mounting and in this case the draining channel 11 is kept open, whereby no pressure will develop in the cavity 3, and the sleeve is displaced to the left on the shaft because of the taper of the press fit surfaces and that the medium pressed through the channel 10 generates a film which eliminates the friction between the press fit surfaces.

As an alternative, the draining channel 11 is kept closed until the pressure medium is completely spread between the press fit surfaces and then opened so that a displacement with a checkable speed takes place.

Figure 2:
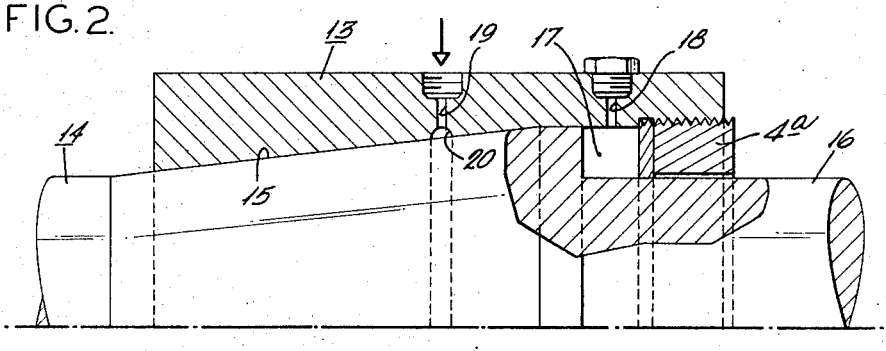

In FIG. 2, an embodiment of the invention is shown in which the piston 4 is fixed to a sleeve 13 and in which a shaft 14 has a tapered portion 15 and a cylindrical portion 16 with a smaller circumference than the large end of the tapered portion whereby the piston 4 which is provided with a seal fits around the cylindrical portion of the shaft. A cavity 17 is limited by the shaft, the sleeve and the piston and is provided with a draining channel 18. In a manner corresponding to FIG. 1, the sleeve is provided with a channel 19 for the supply of a pressure medium, and a peripheral groove 20 in the tapered surface.

Figure 3:
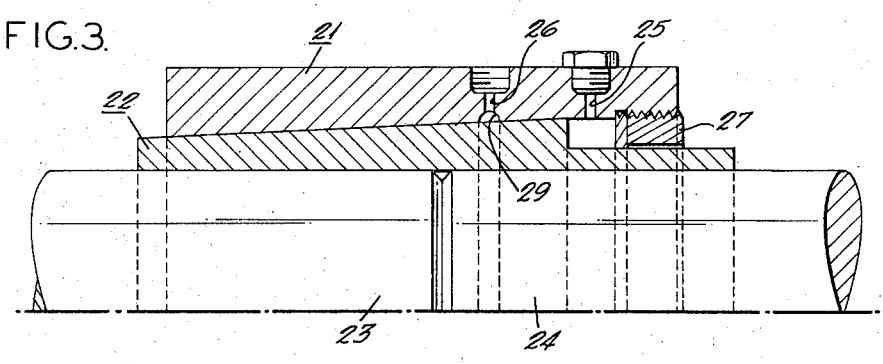

In FIG. 3 is shown another embodiment of the invention in the shape of an outer sleeve 21 and an inner sleeve 22 provided with co-acting tapered portions and acting as a joint between two shafts 23 and 24 of a type known per se. In a manner corresponding to FIG. 2, an annular piston 27 is fixed to one end of the outer sleeve 21 which is provided with channels 25, 26 and a groove 29, whereby the piston fits around a cylindrical portion of the inner sleeve 22.

In the mounting procedure a pressure medium is supplied through a channel 19 (FIG. 2) and 26 (FIG. 3) respectively. When the medium pressure becomes equal to the surface pressure in the joint, the pressure medium starts spreading between the inner and outer tapered portions of the joint parts, and a relative displacement will occur when the conditions related for in connection to FIG. 1 are at hand. Also dismounting is carried out in the same manner as described in connection to FIG. 1.

Figure 4:
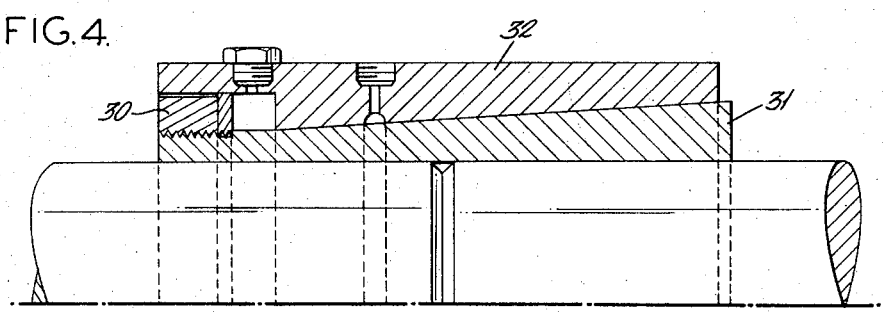

In FIG. 4 an embodiment of the invention is shown which is analogous to what is shown in FIG. 3 with the difference that the annular piston 30 is fixed to the inner sleeve 31 on which the outer sleeve 32 is mounted. The piston device is thus arranged in analogy with what is the case in the embodiment according to FIG. 1, and mounting and dismounting is carried out in a corresponding way.

We claim:

1. Press fit joint comprising inner and outer members having co-acting complementary tapered press fit surfaces, an annular piston means secured to one of said members and slidable relative to the other of said members, means defining an annular recess in said other member, said piston means being axially slidable in said recess and defining with it an annular enclosed chamber for a pressure medium, means defining a first channel in said outer member terminating in a circumferential groove communicating with said tapered surfaces and spaced axially from said annular chamber, means defining a second channel communicating with said annular chamber and plug means for selectively closing said second channel to the atmosphere, said first channel adapted to be connected to pressure medium whereby the pressure medium flows between the tapered surfaces and gradually fills the enclosed annular chamber when said second channel is closed to the atmosphere thereby to effect axial displacement of said inner and outer members relative to one another during mounting of the joint, said second channel being open to the atmosphere during dismounting of the joint to prevent pressure build-up in said annular chamber.

2. A press fit joint as claimed in claim 1 wherein said recess in said other member includes a circumferentially entending radial wall forming an axial end face of said annular chamber confronting a seal mounted adjacent the inner end face of said piston and wherein the effective area of the inner end face of the piston is greater than the area of the radial projection of said tapered surfaces.

3. A press fit joint as claimed in claim 1 wherein the inner and outer member consist of a pair of sleeves, the inner sleeve adapted to be mounted on at least one shaft.

4. Press fit joint comprising inner and outer members having co-acting complementary tapered press fit surfaces, an annular piston means secured to one of said members and slidable relative to the other of said members, means defining an annular recess in said other member, said piston means being axially slidable in said recess and defining with it an annular enclosed chamber for a pressure medium, a seal secured to said one member by said piston and extending radially across the face of said piston to engage said inner and outer members, means defining a first radial channel in said outer member terminating in a circumferential groove communicating with said tapered surfaces and spaced axially from said annular chamber, means defining a second channel communicating with said annular chamber and means for selectively closing said second channel to the atmosphere, said first channel adapted to be connected to pressure medium whereby the pressure medium flows between the tapered surfaces and gradually fills the enclosed annular chamber when said second channel is closed to the atmosphere thereby to effect axial displacement of said inner and outer members relative to one another during mounting the joint, said second channel being open to the atmosphere during dismounting of the joint to prevent pressure build-up in said annular chamber.

5. Press fit joint comprising inner and outer members having co-acting complementary tapered press fit surfaces, an annular piston means secured to one of said members and slidable relative to the other of said members, means defining an annular shoulder on said one member, means defining an annular recess in said other member, said piston means being axially slideable in said recess and defining with it an annular enclosed chamber for a pressure medium, said piston means including a piston threadedly secured to said one member for axial movement with said one member and a seal secured against said shoulder by said piston and extending radially across the face of said piston to engage said inner and outer members, means defining a first radial channel in said outer member terminating in a circumferential groove communicating with said tapered surfaces and spaced axially from said annular chamber, means defining a second channel communicating with said annular chamber and means for selectively closing said second channel to the atmosphere, said first channel adapted to be connected to pressure medium whereby the pressure medium flows between the tapered surfaces and gradually fills the enclosed annular chamber when said second channel is closed to the atmosphere thereby to effect axial displacement of said inner and outer members relative to one another mounting the joint, said second channel being open to the atmosphere during dismounting of the joint to prevent pressure build-up in said annular chamber.

* * * * *